United States Patent [19]

Campbell

[11] 3,946,633

[45] Mar. 30, 1976

[54] APPARATUS AND METHOD FOR MAKING A SHINGLE

[76] Inventor: Paul A. Campbell, Rte. 2, Box 301 A, Arlington, Wash. 98223

[22] Filed: Dec. 7, 1973

[21] Appl. No.: 422,733

[52] U.S. Cl. ........................ 83/705; 83/36; 83/704; 144/13; 144/326 R; 269/58; 269/188; 269/265; 269/268

[51] Int. Cl.$^2$.. B26D 7/06; B27B 5/02; B60G 11/18; B27M 3/02

[58] Field of Search ............ 144/13, 326, 162, 193, 144/3 P, 3 Q; 83/36, 704, 705, 706; 269/56, 58, 188, 201, 265, 268

[56] References Cited

UNITED STATES PATENTS

| | | | |
|---|---|---|---|
| 771,734 | 10/1904 | Kephart | 83/704 |
| 1,261,581 | 4/1918 | Marshall | 83/705 |
| 1,806,979 | 5/1931 | Koski | 83/704 X |
| 3,754,586 | 8/1973 | Daniels | 83/705 X |
| 3,776,287 | 12/1973 | Hughes | 83/706 X |

*Primary Examiner*—Travis S. McGehee
*Assistant Examiner*—W. D. Bray
*Attorney, Agent, or Firm*—Thomas W. Secrest

[57] ABSTRACT

This invention is directed to an apparatus and method for making a shingle from a block of wood. The block of wood is canted and a shingle is sawed from this block of wood. The shingle has a thick end and a thin end. After the shingle has been sawed, the block of wood is moved away from the saw and canted at a new angle with respect to the saw. Then, the block of wood is moved toward the saw and another shingle is sawed. This process is repeated to form shingles from a block of wood.

27 Claims, 36 Drawing Figures

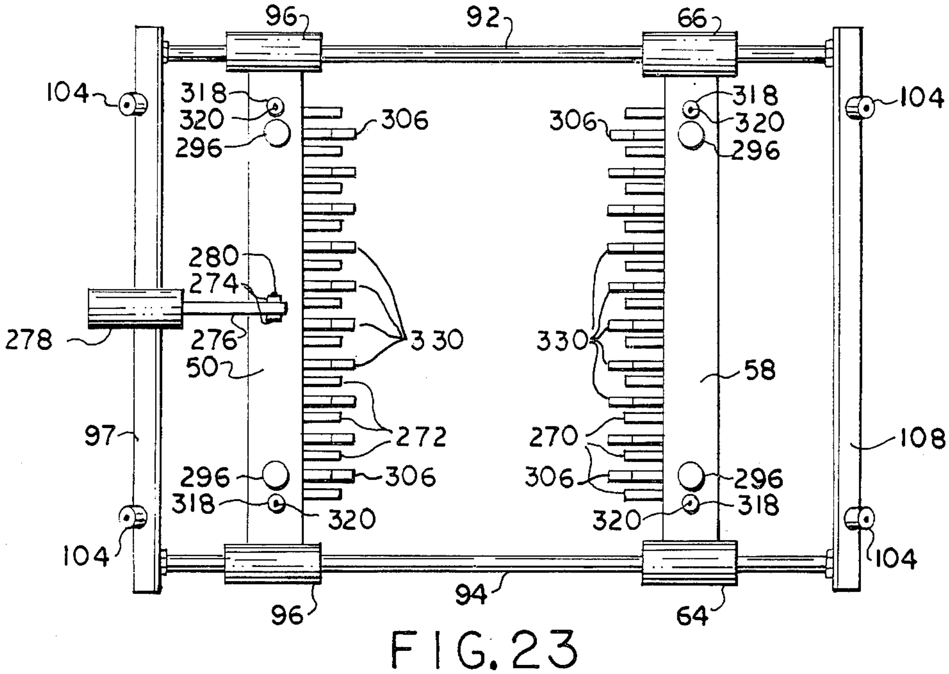
FIG. 23
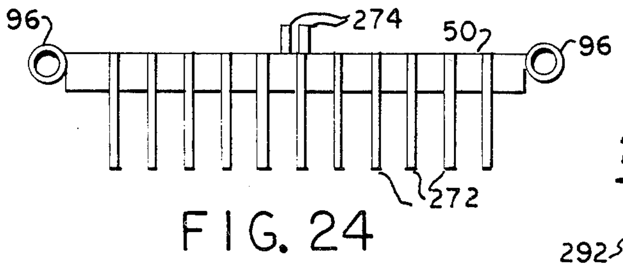
FIG. 24
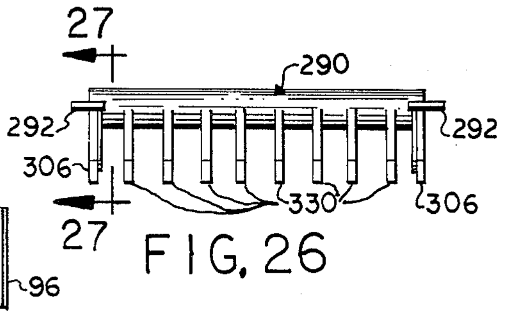
FIG. 26
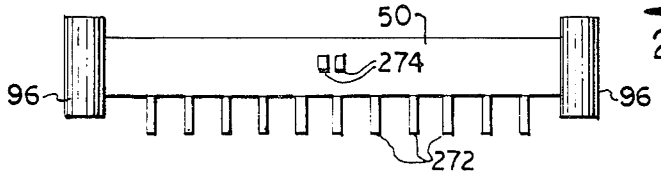
FIG. 25
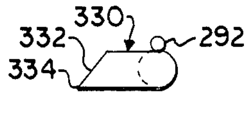
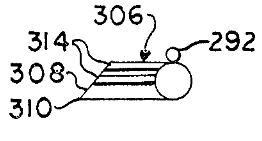
FIG. 28
FIG. 27

APPARATUS AND METHOD FOR MAKING A SHINGLE

BRIEF DESCRIPTION OF THE INVENTION

A wooden shingle is generally made from a block of cedar. Cedar has desirable weathering properties and a long life when exposed to the sun, the wind, the rain, the snow, and general weather conditions.

One of the ways to make shakes for use in roofing was a manual way. In fact, many people still make shakes in this manual manner. If there be a round cedar block, then the cedar block is split into a smaller block. Then, the shake maker with a froe splits off a shake from the smaller block. The shake maker continues to split off the shakes by hitting the froe, normally with a piece of wood, such as a piece of alder. The shake splits off of the block of cedar. The shake is a good shake, pleasing in appearance, and has good weathering qualities. A limitation on the making of shakes in this manner is the fact that the shake maker can make only one shake at a time and the process is slow. An advantage is that the shake maker does not need a large investment in equipment to make the shakes. Essentially, the shake maker needs a block on which to place the cedar block, a froe, and a piece of wood, such as an alder limb, to hit the froe to split the shake from the cedar block. One shake maker can make only a few hand split shakes in a day.

Another way a shake is made is by taking a cedar log, sawing off a desirable length of log to make a round block having a length of, approximately, 24 inches. Then, by means of a power splitter, the round cedar block is broken into smaller blocks. It is possible to split off thick shakes by means of the power splitter. The thick shakes can be transferred to a sawyer who saws on a band saw the thick shakes into two pieces of sawed shakes or the sawyer can true an uneven shake so as to be acceptable for use. Also, the sawyer can saw the sides of the shakes so as to have even sawed sides. From this description of making shakes with power equipment, it is seen that the power splitter can harm a person or persons splitting the round cedar blocks into smaller blocks or else splitting off shakes from the smaller blocks. From observation, I have seen the power splitter, easily, split the cedar block into thick shakes or into smaller blocks. In this operation, a person can, easily, lose a finger or a hand, or part of an arm because of the power splitter. Also, the band saw is a potential source of injury as the person sawing a thick shake into smaller shakes, pushes the shake into the band saw and reaches around the band saw to grasp the two smaller shakes. It is possible for this person, operating the band saw, to lose a finger, or a hand, or an arm. Also, if the operator at the band saw trues up the end of a rough shake, it is possible for him to injure his fingers, or hand, or arm. The production from this above-described method of making shakes in a high production and the number of people using the power equipment can make a large number of shakes per unit time. In fact, in one shake mill with which I am familiar, the workers are paid a minimum hourly wage plus piecemeal pay. The net result is that the workers make a good daily remuneration because of the high production and pay on a piecemeal basis.

Another way in which a shingle has been made is on a piece of equipment which has been in use for a number of years. As the reader imagine and, that you are looking down on two vertical saws. The two saws are at right angles to each other but are not touching or in contact with each other. There is a large saw, varying in diameter from 42 inches to 48 inches and a smaller saw. The operator faces the smaller saw with his left hand or left arm reaching toward the larger saw. The operator can force a block of cedar into the larger saw so as to saw off a shingle. The operator reaches over and takes the sawed shingle with his left hand and then places with his right hand, the sawed shingle in position to the smaller saw. The operator trues the sides of the shingle on the smaller saw so as to have an even side or smooth sides. In operating this piece of equipment, the operator, generally, will not look at the larger saw. There is a feed mechanism for moving the block of cedar toward the larger saw and the operator can reach his left hand over toward the larger saw to remove the sawed shingle. Again, the operator, generally, does not look at the larger saw. It is seen that in this manner the operator may get his finger or hand in the path of travel of the larger saw and may lose a finger or part of a hand. In fact, many operators making shingles with this machine have lost fingers on the left hand. Further, the operator by placing the shingle with his right hand next to the smaller saw, is also in a position of losing a finger or part of a hand. Sometimes, a shingle or piece of wood becomes wedged with respect to the smaller saw and the operator must try to remove this piece of wedged wood. While trying to remove the piece of wedged wood, the operator may lose a finger, a hand, or part of an arm. The production from the sawyer in the making of sawed shingles with this machine is a relatively high production. One shingle maker can make a relatively large number of shingles which can be bundled into squares for roofing purposes. A main drawback to this machine is the fact that the operator can lose a finger or part of a hand or even part of the arm. This has happened to operators using this type of shingle making machinery. To lessen the possibility of an operator losing a finger or a hand, the large saw varies in diameter from 42 inches to 48 inches and, it is my understanding that the large saw cannot be of a diameter less than 42 inches. A 42 inch circular saw is a good sized saw.

GENERAL DESCRIPTION OF THE INVENTION

The invention comprises a saw for sawing a shingle from a block of wood; a clamping means for clamping the block of wood and for moving the block of wood with respect to the saw; and, a cradle for positioning said block of wood with respect to said saw to realize the desired taper and thickness for said shingle.

A block of wood is positioned on the cradle. Then, the clamping means clamp onto the block of wood and move the block of wood toward the saw. The saw saws the shingle from the block of wood. Then, the clamping means moves the block of wood back to the vicinity of the cradle and lets go of the block of wood so as to allow the block of wood to, once again, rest on the cradle. This time, the cradle cants the block of wood with respect to the saw. Then, the clamping means, once again, clamps the block of wood and moves it toward the saw whereby another shingle is sawed from the block of wood. This process is repeated numerous times to allow the block of wood to be, substantially, automatically, canted in a new position, each time, with respect to the saw.

It is not necessary for an operator to cant the block of wood by himself. Also, it is not necesary for the operator to endanger his limbs by positioning his limbs close to the saw.

The saw which I use is a circular saw for sawing the shingles from the block of wood.

An object and advantage of this invention is to provide an apparatus which, substantially, automatically, cants and positions a block of wood with respect to a saw so that upon movement of the block of wood to the saw, a shingle can be cut from the block of wood, an additional object is to provide such an apparatus having safety guards for the limbs and hands of the operator; a further important object is to provide such an apparatus for making shingles wherein the loading of the block of wood into the apparatus can be achieved with safety; another important object is to provide such an apparatus wherein the shingle, after being sawed from the block of wood, moves away from the saw; and, another important object and advantage is to provide such an apparatus wherein the control of the block of wood with respect to the saw is under the manual control of the operator.

These and other important objects and advantages of the invention will be brought forth upon reference to the detailed description of the invention, the appended claims, and the accompanying drawings.

THE DRAWINGS

FIG. 1 is a schematic illustration of the cradle for canting and positioning the block of wood with respect to the saw; the clamping means for clamping the block of wood for movement of the block of wood with respect to the saw; the saw; and the appratus for automatically positioning the block of wood with respect to the cradle, FIGS. 2, 3, 4, and 5 are stop motion figures of the positioning of the block of wood with respect to the saw and wherein FIG. 2 illustrates the block of wood as being positioned on the cradle and the clamping means as contacting the block of wood;

Figure 8:
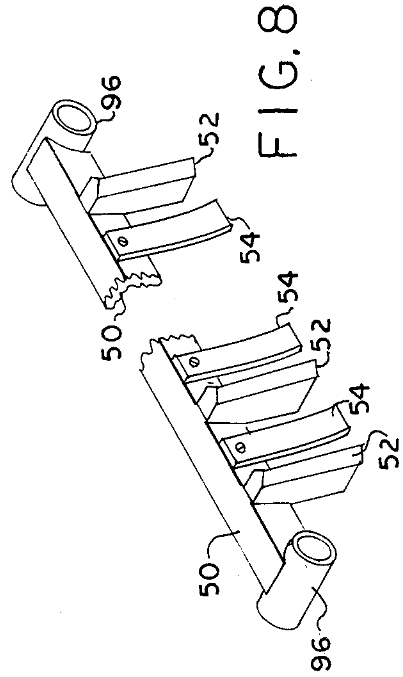
Figure 9:
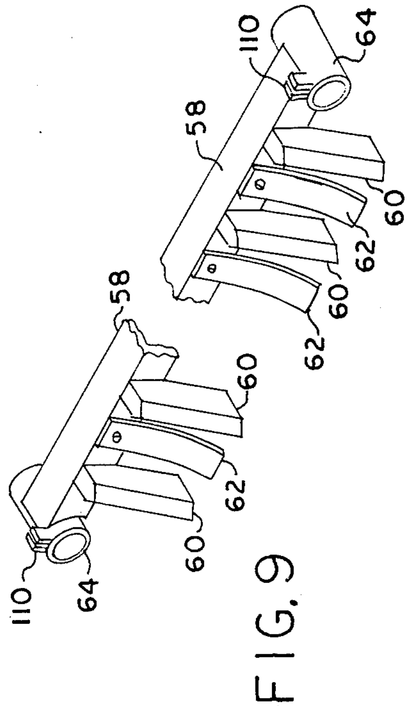
Figure 15:
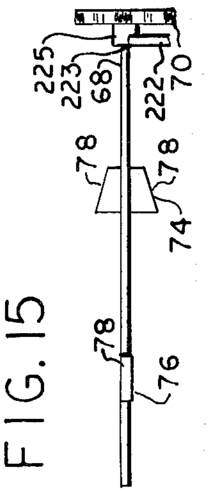
Figure 16:
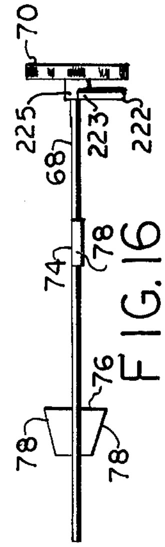
Figure 17:
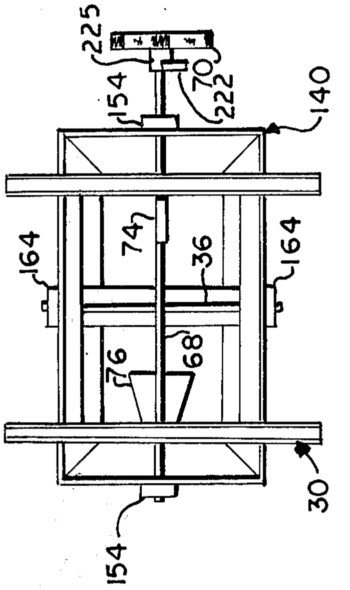
Figure 14:
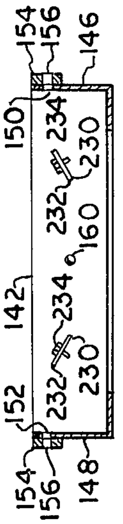
Figure 13:
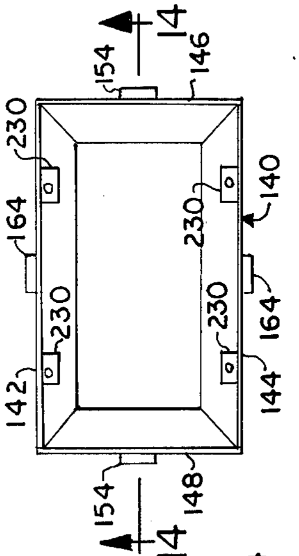
Figure 12:
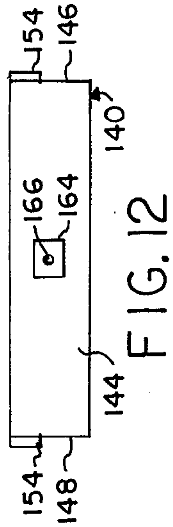
Figure 10:
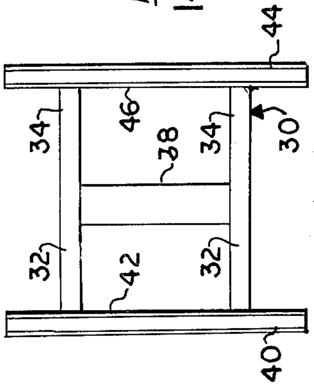
Figure 11:
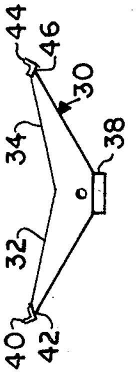
Figure 18:
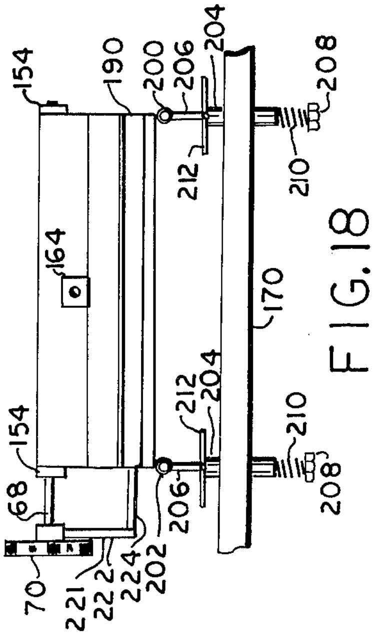

FIG. 8, on an enlarged scale, illustrates the fixed side of the clamping means;

FIG. 9 is a view illustrating the movable side of the clamping means;

FIG. 10 is a plan view of the cradle;

FIG. 11 is an end elevational view of the cradle;

FIG. 12 is an end view of the frame for the cradle;

FIG. 13 is a plan view of the frame for the cradle;

FIG. 14, taken on line 14—14 of FIG. 13, is a vertical cross-sectional view of the frame for the cradle;

FIG. 15 illustrates the cam shaft and one cam in position for positioning the block of wood on the cradle;

FIG. 16 is a view of the cam shaft of FIG. 15 and after being rotated 90° so as to show the position of the other cam on the cam shaft for positioning the block of wood on the cradle;

FIG. 17 shows the assembly of the frame for the cradle, the cam shaft and cams, and the cradle;

FIG. 18 is a fragmentary and elevational view illustrating the framework for the cradle and also the leveling means for the apparatus.

Figure 20:
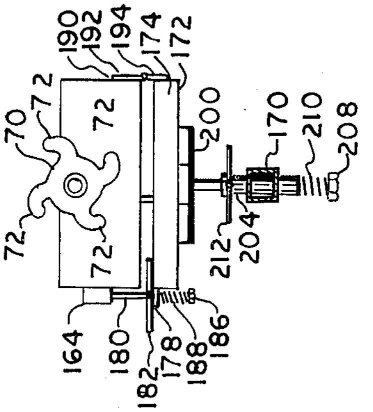
Figure 19:
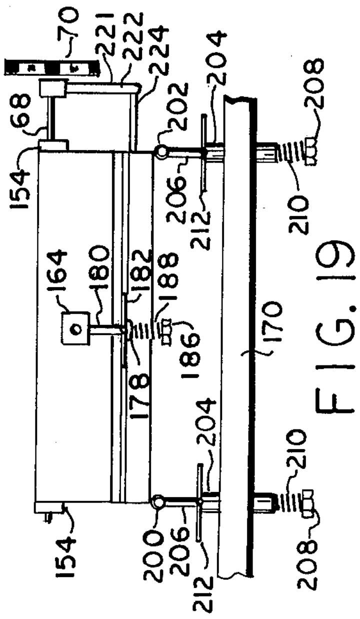
Figure 22:
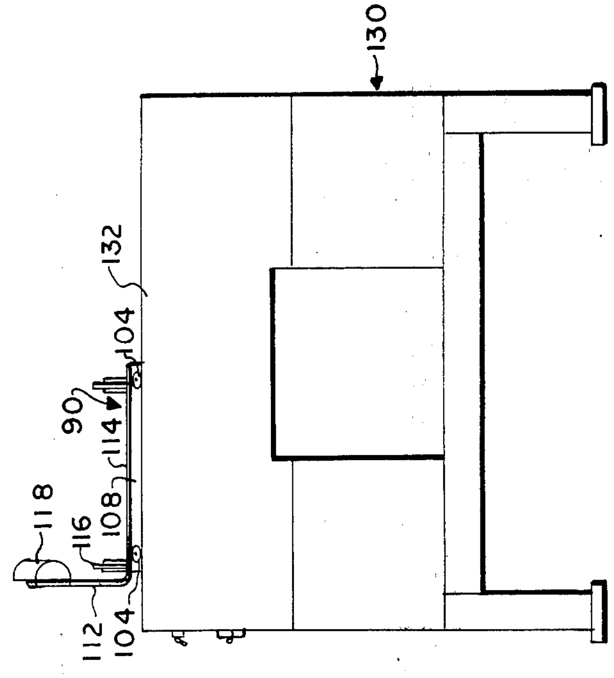
Figure 21:
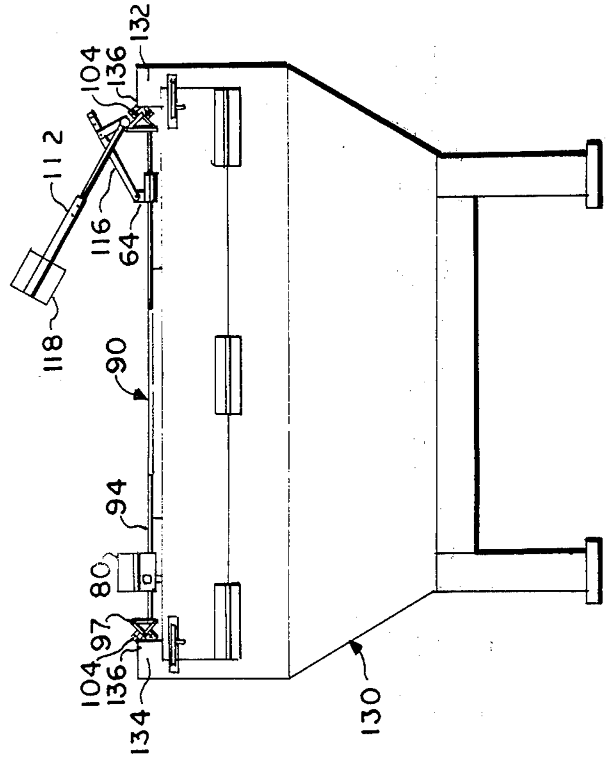
Figure 29:
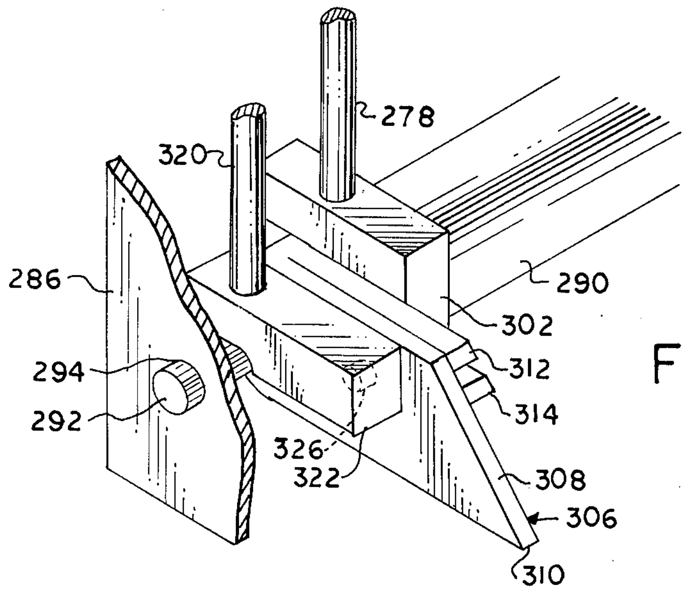
Figure 30:
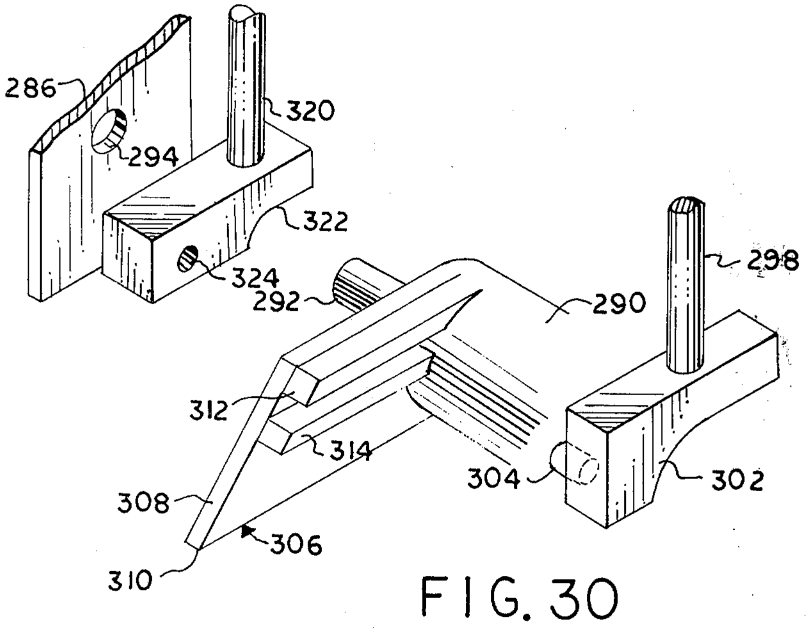
Figure 31:
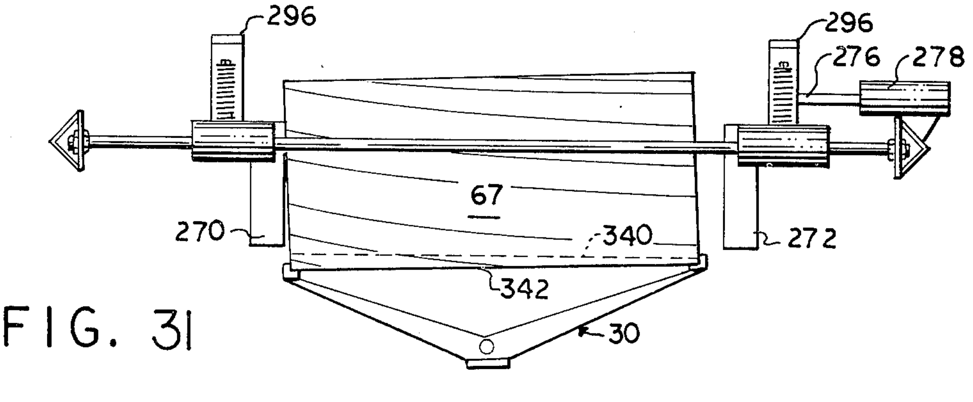
Figure 32:
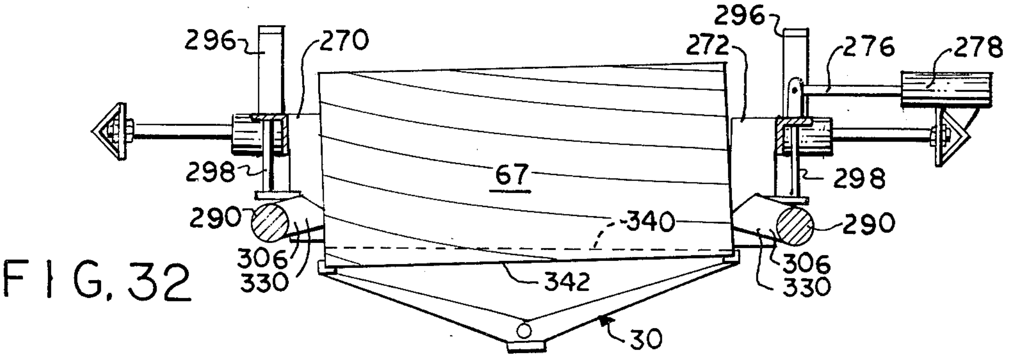
Figure 33:
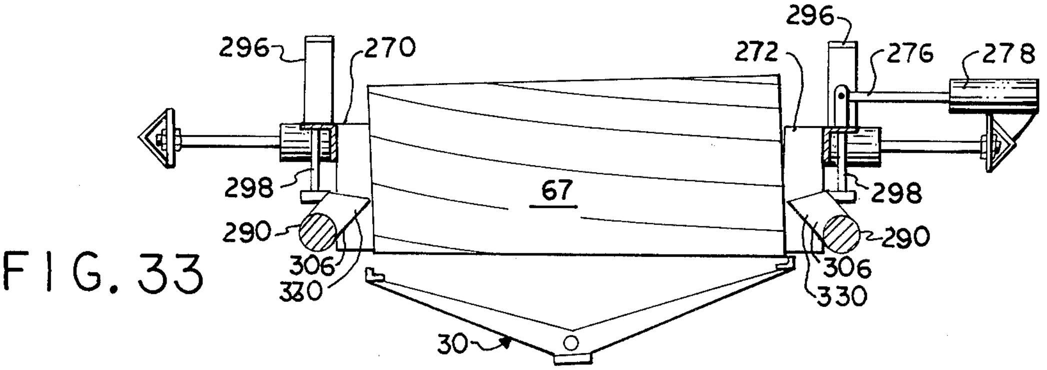
Figure 34:
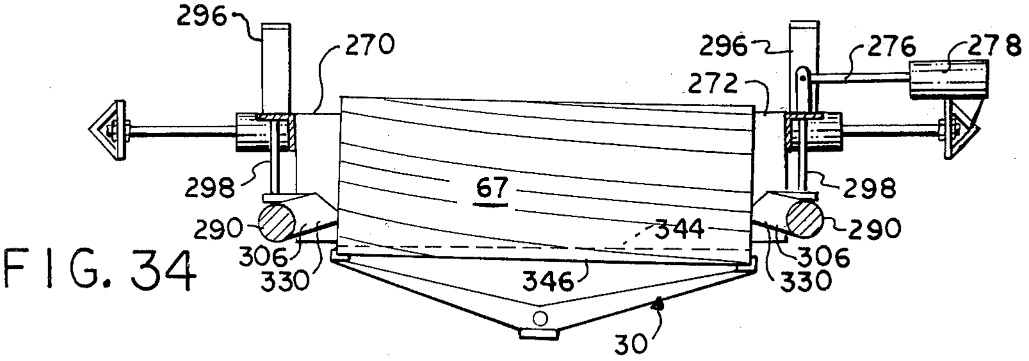
Figure 35:
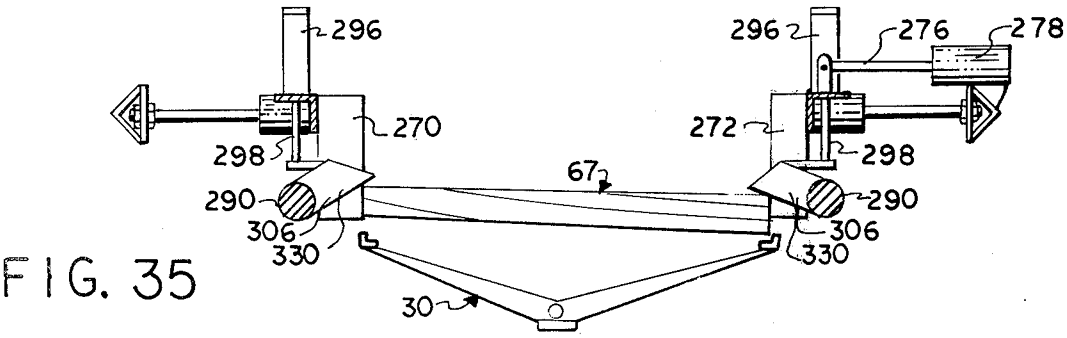
Figure 36:
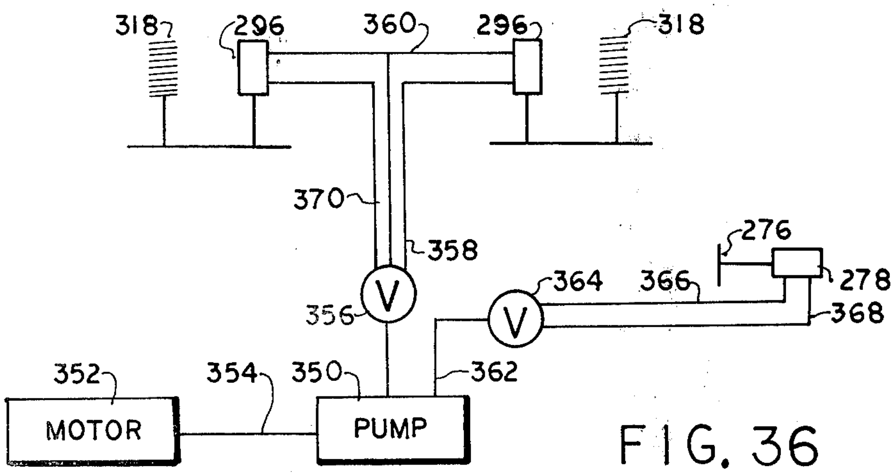

FIG. 19 is an end elevational view of the other end of the framework for the cradle and the levelling means for the apparatus;

FIG. 20 is a side elevational view illustrating a cam on the cam shaft for rotating the cam and to position the block of wood on the cradle;

FIG. 21 is an end elevational view of the apparatus showing the framework and the legs for supporting the frame, and the levers for operating the clamping means and the movement of the clamping means with respect to the saw;

FIG. 22 is a side elevational view illustrating the levers for moving the clamping means with respect to the block of wood;

FIG. 23 is a plan view looking down on another version of the carriage for holding the shake bolt and for moving the shake bolt with respect to the saw;

FIG. 24 is an elevation view looking at the support bar and the clamping teeth of said carriage;

FIG. 25 is a plan view looking down on the support bar and clamping teeth for the movable side of said carriage;

FIG. 26 is a plan view looking down on a support bar and rotatable teeth of said carriage;

FIG. 27 is a side elevational view looking at an end rotatable to said carriage;

FIG. 28 is a side elevational view looking at a rotatable tooth of said carriage;

FIG. 29 is an exploded perspective view looking at the end rotatable tooth and illustrates the mechanism for rotating the support bar in the end rotatable tooth;

FIG. 30 is an exploded perspective view looking at the end rotatable tooth and the mechanism for rotating the support bar in the end rotatable tooth;

FIG. 31 is an elevational view illustrating a shake bolt positioned on the rotatable cradle and with the clamping teeth not yet clamping the shake bolt;

FIG. 32 is an end elevation view illustrating the shake bolt positioned on the rotatable cradle, the clamping teeth clamping the shake bolt and the rotatable teeth bearing against the shake bolt prior to a shake being sawed from the shake bolt;

FIG. 33 is an elevational view illustrating the shake bolt after the shake has been sawed from the shake bolt and with the clamping teeth clamping the shake bolt and with the rotatable teeth out of engagement with the shake bolt;

FIG. 34 is an end view illustrating the shake bolt on the cradle with the cradle rotated in another position and the clamping means clamping the shake bolt and the rotatable teeth bearing into the shake bolt;

FIG. 35 is an elevational view illustrating the end of a shake bolt or a small shake bolt being clamped by the clamping teeth and the rotatable teeth bearing down on the shake bolt but with the shake bolt not positioned on the cradle; and FIG. 36 is a schematic outline illustrating the components for activating the fluid activated cylinder.

DETAILED DESCRIPTION OF THE INVENTION

Figure 1:
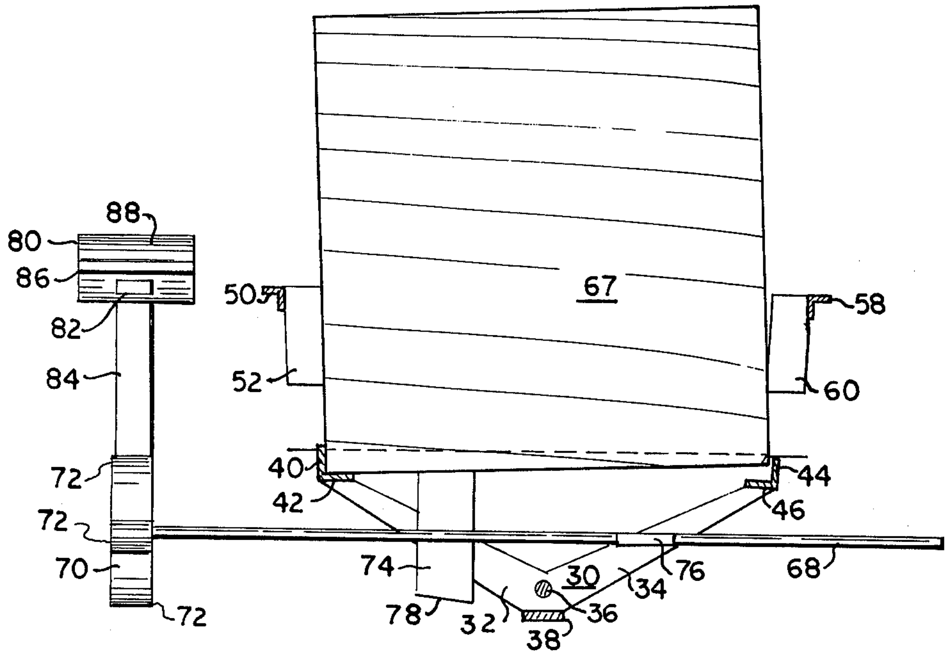

In FIG. 1 there is a schematic illustration of the cradle, clamping means, and cams for positioning a block of wood on the cradle.

There is the cradle 30 having a leg 32 and a leg 34. It is seen that the legs 32 and 34 are in the position of a V-configuration.

The cradle 30 is mounted on a shaft 36. The cradle 30 mau freely rotate with respect to the shaft 36.

In FIGS. 10 and 11 there is a more definitive illustration of the cradle 30. It is seen that there are two spaced apart legs 32 and two spaced apart legs 34.

The legs are connected by a lower support bar 38. On the outer end of the legs 32, there is positioned an angle member having legs 40 and 42. On the outer end of the legs 34 there is positioned an angle member having legs 44 and 46.

The legs 40, 42 and the legs 44, 46 provide support for the edge of the block of wood and also position the edge of the block of wood.

The clamping means comprises a fixed support bar 50 having a plurality of teeth 52. In FIG. 8 it is seen that positioned between the teeth are springs 54. Again, the support bar 50 is fixed.

Also, in FIG. 1, it is seen that there is a movable support bar 58 having teeth 60. In FIG. 9, it is seen that between the teeth 60 there are springs 62. On the end of the support bar 58 are sleeves 64 and 66.

The teeth 52 and 60 bite into the block of wood 67.

Positioned near the cradle 30 is shaft 68. In FIG. 1, it is seen that on the left end of the shaft 68 there is a cam 70 having four lobes 72. In this regard see FIG. 20, which clearly illustrates the shaft 68, the cam 70, and the four lobes 72.

Also, on the shaft 68 are two cams 74 and 76. In this regard see FIGS. 15, 16, and 17, which show the cams 74 and 76. The cams 74 and 76 comprise, essentially, a flat plate having an angle edge 78. Also, the cams 74 and 76 are positioned at 90° with respect to each other.

In FIG. 1 it is seen that there is a left handle 80 attached to a rod 82. There is dependent from the rod 82 a pawl 84. The pawl 84 contacts the cam 70 for rotating the shaft 68 and the cams 74 and 76.

The rod 82 is attached to the clamping means. An operator grasps the left handle 80 and pushes the clamping means and the wood block 67 with respect to the saw. The left handle 80 comprises a rod 86 and guard 88. The guard 88 is a safety precaution to protect the hand of the operator.

Figure 6:
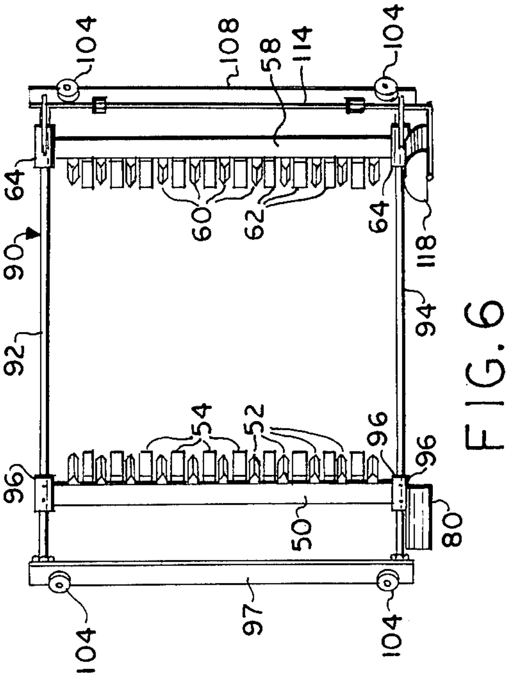
FIG. 6 is a plan view looking down on the clamping means.
Figure 7:
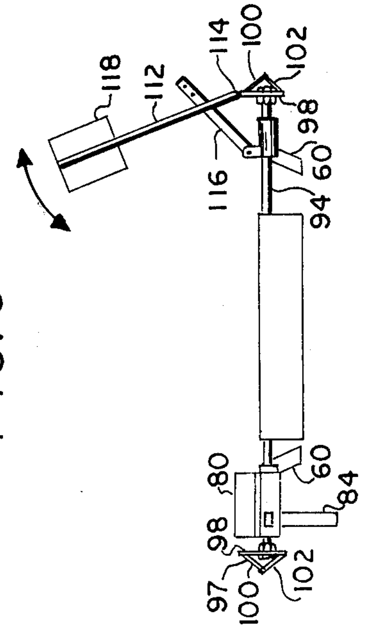
FIG. 7 is an end elevational view looking at the clamping means.

In FIGS. 6 and 7 there is illustrated the clamping means assembly and in FIGS. 8 and 9 there is illustrated the supports for the teeth for biting into the block of wood 67.

In FIGS. 6 and 7, it is seen that there is the left handle 80 and the pawl 84.

The clamping means assembly 90 comprises two rods 92 and 94.

The fixed support bar 50 is attached to the two rods 92 and 94 by means of sleeves 96 on the ends of the bar 50. As is seen in FIG. 8, the sleeves 96 are welded or fixedly attached to the fixed support bar 50. Also, it is seen in FIG. 8 that the teeth 52 are fixedly attached to the support bar 50 and that the springs 54 are positioned between the teeth 52 and attached to the support bar 50. Again, the support bar 50 is fixedly attached to the sleeves 96 and the sleeves 96 are fixedly positioned on the rods 92, such as by tack welding or other suitable means.

On the left end of the rods 92 there is positioned a roller support bar 97. The roller support bar, as is seen in FIG. 7, in an end view shows a base member 98 and two legs 100 and 102 in the appearance of an isosceles triangle. With respect to FIGS. 6 and 21, there is mounted on the leg 100 two spaced apart rollers 104 and there is mounted on the leg 102 two spaced apart rollers 104.

In FIGS. 6 and 7, it is seen that on the right end of the rod 92, there is positioned a roller support bar 108. The roller support bar 108 comprises a base 98 and two legs 100 and 102. There is mounted on the leg 100 of the roller support bar 108 two spaced apart rollers 104 and there is mounted on the leg 102 of the roller support bar 108 two spaced apart rollers 104.

In FIG. 9, it is seen that on the movable support bar 58 that there are two sleeves 64 and 66. The support bar 58 of sleeves 64 and 66 may be attached to each other by welding or other suitable means.

On the sleeves 64 and 66 are spaced apart lugs 110. There is attached to the roller support bar 108 and the legs 110 and 102 rotatable rod 112. On the upper part of the support bar 108, there is a shaft 114 and the rotatable rod is free to rotate around the rod 114. Lever arm 116 connects with the rotatable rod 112 and the lugs 110. In fact, there are two lever arms 116 for connecting with the rod 112 and the lugs 110.

The sleeves 64 and 66 are free to slide on the rods 92.

On the upper end of the rotatable rod 112, there is positioned protective guard 118. The protective guard 118 protects the hand of the operator.

Also, it is seen that on the movable support bar 58 there is positioned teeth 60 and between the teeth 60 there are positioned springs 62.

From FIGS. 7 and 21, it is seen that an operator may grasp the upper end of the rotatable rod 112 and move the movable support bar 58 and the teeth 60 toward the wood block 67 by rotating the rotatable rod 112 in a counterclockwise direction. Conversely, by rotating the rotatable arm 112 in a clockwise direction, the movable support bar 58 and the teeth 60 are moved away from the block 67.

There is a frame 130 for the cradle, clamping means, and saw, see FIGS. 21 and 22, and which frame has upwardly inwardly directed parts 132 and 134.

On the inside of the part 132, there is a guide 136, and on the inside of part 134, there is a guide 136. The guides 136 may be rods. The rollers 104 bear against the guides 136 so as to allow the clamping means assembly to ride on the guides 136.

In FIGS. 12, 13, 14, and 17, there is illustrated a cradle assembly 140.

The cradle assembly 140 comprises sides 142 and 144 and ends 146 and 148.

In the end 146, there is a passageway 150 and in the end 148, there is a passageway 152. A bearing member 154 having a passageway 156 is attached to the end 146 and the passageway is alined with the passageway 150. A bearing member 154 having a passageway 156 is attached to the end 148 and the passageway 158 is alined with the passageway 152.

In the side 142, there is a passageway 160 and in the side 144, there is a passageway 162.

A bearing 164 having a passageway 166 is attached on the outside of the side 142 and the passageway 166 is alined with the passageway 160.

Also, there is a bearing 164 having a passageway 166 on the outside of the side 144, and with the passageway 166 alined with the passageway 162.

The shaft 36 is positioned in the passageway 160 and 166 and in the passageways 162 and 166.

In FIG. 17, a plan view, it is seen that the shaft 36 is positioned in the cradle assembly 140 and, also, the shaft 68 is positioned in the cradle assembly 140. The shaft 68 is free to rotate in the bearing 154 and in the passageways 150 and 156 and in the passageways 152 and 156. As previously explained, with rotation of the shaft 68, the cams 74 and 76 also rotate so as to position and cant the block of wood 67 with respect to the saw.

As part of the frame 130, there is a base cross member 170.

There is a frame 172 for supporting a cradle 30. The frame 172 comprises ends 174 and sides 176 welded into an integral structure.

There is welded to the side 176 a sleeve 178. In the sleeve there is positioned a threaded rod 180. The threaded rod 180 connects with the bearing 164. There is a spider 182 having a tapped passageway 184. Also, on the bottom end of the rod 180 there is a bolt 186 and there is a spring 188 for keeping tension between the spider 182 and the rod 180. The spider 182, or handle 182, can be rotated to vary the position of the cradle 30 with respect to the frame 172.

In FIG. 20, it is seen that a hinge having an upper leaf 192 and a lower leaf 194 is welded to the frame 172 at the leaf 194 and is welded to the cradle 30 at the leaf 192. In other words, the cradle 30 can rotate with respect to the frame 172 around the hinge 190. By varying the position of the rod 180, it is possible to rotate the cradle 30 around the hinge 190. It is evident that this is part of a leveling means for the cradle assembly.

In FIGS. 18 and 19, it is seen that there is a bushing 200 connecting with one end of the frame 172 and a bushing 202 connecting with the other end of the frame 172. There is positioned on the raised cross member, two sleeves 204. Positioned in each sleeve 204 is a rod 206. On the lower end of the rod 206, there is a nut or stop 208. There is a spring 210 positioned between the stop 208 and the sleeve 204. Also, there is spider or handle 212 having a passageway 214. In the sleeve or bushing 202, there is a rod 216 which is free to rotate in said sleeve or bushing. The threaded rod 206 is fixedly positioned to the rod 216 by welding or other suitable means. As is evident, by turning the handle or spider 212, it is possible to vary the position of the frame 172 with respect to the base cross member 170 and thereby vary the position of the cradle. In other words, the rods 206 make it possible to level the cradle. Further, the rods 206 and associated elements make it possible to adjust the position of the cradle with respect to the saw 220. Also, by adjusting the position of the threaded rod 180, it is possible to assist in the leveling of the cradle 30.

In FIGS. 15–19 there is illustrated a stop means or a positioning means for restricting the rotation of the shaft to 90° or one quarter of a revolution. On the shaft 68, adjacent the cam 70, is a square block 223 having four faces 225 at 90° angles. The rod 224 connects with the frame 172. A spring 227 connects with the rod 224 and bears against a face 225 of the block 223 to stop the rotation of the shaft 68 and the cams 78. From this description, it is seen that the cam 70 and the shaft 68 and the block 223 are rotated one quarter of a turn upon the movement of the clamping means assembly 90. The spring 222 bears against the block 223 to prevent the further rotation of the shaft 68 and the cam 70 without movement of the assembly 90.

In FIGS. 13 and 14, it is seen that on the side 142 there are two spaced apart stops 230 and that on the side 144 there are two spaced apart stops 230. Each stop 230 comprises a lug 232 welded to the side and bolt 234 screwed into a threaded passageway in the lug 232. By adjusting the position of the bolt 234 with respect to the lug 232, it is possible to control the rotative movement of the cradle 30. In other words, it is possible to control the canting of the block 67 with respect to the saw 220 and thereby control the thickness of the shingle. Or, to control the thickness of the thick end of the shingle and the thickness of the thin end of the shingle.

In FIGS. 2, 3, 4, and 5, there is illustrated the positioning of a wood block 67 on a cradle 30 and the movement of the wood block to the saw 220 for making a shingle 240.

Figure 2:
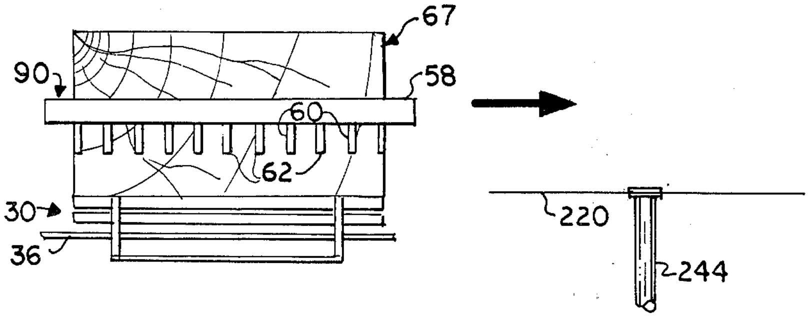
Figure 3:
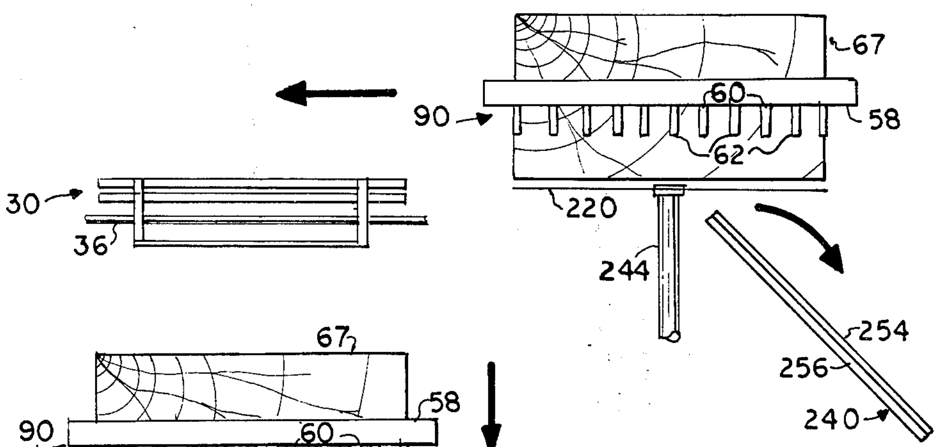
FIG. 3 illustrates the clamping means as having moved the block of wood to the saw so that the saw has cut a shingle from the block of wood.

In FIG. 2, it is seen that the clamping means assembly 90 and in particular, the movable support bar 58 with teeth 60 and springs 62 contact a wood block 67 positioned and canted on the cradle 30.

Then, the clamping means assembly 90 moves the wood block 67 so as to pass over the saw 220 and to form a shingle 240 by the saw 220 sawing off the shingle from the wood block.

Figure 4:
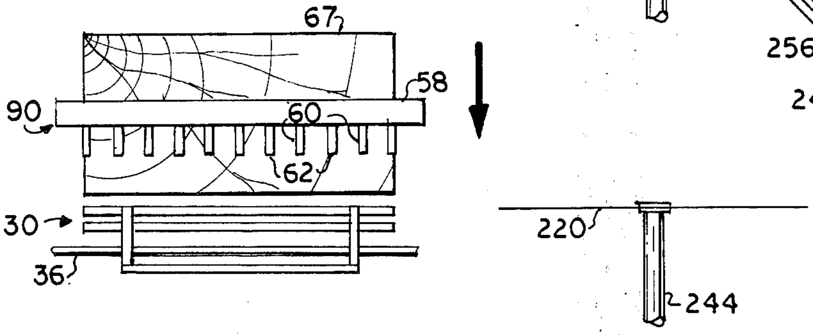
FIG. 4 illustrates the clamping means as having moved the block of wood over the cradle but not, yet, having released the block of wood so as to fall onto the cradle and be canted and positioned with respect to the saw for the cutting of the next shingle by the saw from the block of wood.

In FIG. 4, it is seen that the clamping means assembly 90 and, in particular, the movable support bar 58 has moved the wood block 67 back over the cradle 30. However, it is seen that the wood block 67 is placed above and apart from the cradle 30.

Figure 5:
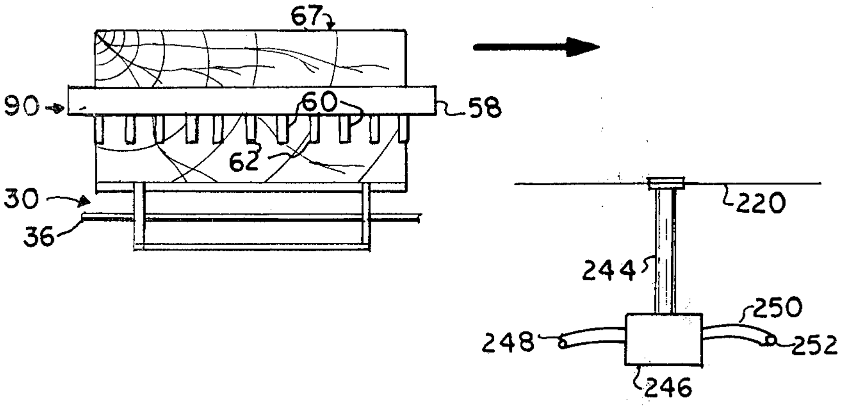
FIG. 5 illustrates the block of wood as having been allowed to fall onto the cradle and to be positioned with respect to the saw and also with the clamping means clamping the block of wood.

In FIG. 5, it is seen that the movable support bar 58 has been moved away from the wood block 67 and that the wood block 67 has fallen onto the cradle 30 so as to be positioned and canted with respect to the saw 220, prior to the movement of the wood block 67 to the saw 220 for the formation of another shingle 240.

In this sequence of events, it is seen that the wood block 67 is initially positioned on the cradle 30 and that the position of the wood block 67 with respect to the saw 220 is determined by the cams 74 and 76. After the wood block 67 has been positioned on the cradle 30, the operator grabs hold of the rod 212 by inserting his hand in the guard 118, see FIG. 7, and rotates the rod 212 in a counterclockwise direction so as to have the teeth 60 bite into the wood block 67. Then, the operator can manually move the clamping means assembly 90 and the wood block 67 toward the saw 220 by grabbing hold of the rod 86 in the left handle or in the guard 88 and moving the clamping means assembly and the wood block 67 toward the saw 220. After the shingle 240 has been sawed from the wood block 67, the operator can bring back the clamping means assembly 90 and the wood block 67 so as to position the wood block 67 over the cradle 30. Then, the operator rotates the rod 112, see FIG. 7, in a clockwise direction so as to release the wood block 67 to fall onto the cradle 30 and position itself on the cradle 30. Then, the operator rotates the rod 112 in a counterclockwise direction and moves the clamping means assembly 90 and the wood block 67 toward the saw 220 as previously described to form another shingle 240.

The saw 220 is mounted on a shaft 244. The shaft 244 connectes with an electric motor 246 which in turn connects by lines 248 and 250 with a source of power 252, such as a generator. The motor 246 is secured by a bracket 247 to the frame 130 of the apparatus.

From the foregoing, it is seen that I have provided an apparatus and a method for sawing a shingle from a block of wood. In particular, the block of wood can be simultaneously positioned and canted with respect to the saw by the force of gravity wherein the block of wood drops from a clamping means assembly onto a cradle. Then, the clamping means assembly can be tightened so as to grasp the block of wood and, also, the clamping means assembly can be moved with the block of wood toward the saw so that the saw saws off a shingle 240 having a thin edge 254 and a thick edge 256. In this apparatus and method, provision is made to guard the hand of the operator by means of a guard 88 and also by means of guard 118. In fact, the guards 88 and 118 are half right circular cylinders which encompass the fingers and part of the body of the hand of the operator. In this manner, the operator can operate the apparatus in a safer manner and with less fear of the possible loss of a finger or part of a hand.

In FIGS. 23–36 there is illustrated means for positioning the shake bolt with respect to the cradle 30.

In FIG. 23, a plan view, there is illustrated the parallel rods 92 and 94 connecting with the roller support bars 97 and 108. It is to be recalled that the roller support bars 97 and 98 and the rods 92 and 94 are an integral unit and move toward and away from the saw 220.

There is a sleeve 66 on the rod 92 and there is a sleeve 64 on the rod 94. A support bar 58 connects with the sleeves 64 and 66. The sleeves 64 and 66 and the support bar 58 are fixedly positioned with respect to the rods 92 and 94.

Also, on the rods 92 and 94 are movable sleeves 96. A support bar 50 connects with the movable sleeves 96. It is to be recalled that the sleeves 96 and the support bar 50 can move, rectilinearly, on the rods 92 and 94.

On that side of the support bar 58 which faces the support bar 50 are, fixedly, positioned clamping teeth 270.

On that side of the support bar 50 which faces the support bar 58 are clamping teeth 272.

In FIGS. 23, 24, and 25, there is illustrated on the upper surface of the support bar 50 two spaced apart lugs 274.

In FIG. 23, it is seen that there is attached to the lugs 274 ram 276 which connects with the fluid actuated cylinder 278. The ram 276 connects with the lugs 274 by means of a bolt or rod 280.

In FIGS. 31–35, it is seen that the fluid actuated cylinder 278 connects with the roller support bar 97 by means of a lug 282.

It is, readily, realized, that by moving the ram 276 that the support bar 50 and the clamping teeth 272 move with respect to the rods 92 and 94 and the clamping teeth 270 on the support bar 58.

In FIG. 24, there is illustrated the support bar 50 and also the support bar 58, in parenthesis. From the support bars 50 and 58, are two depending support flanges 286.

There is rotatably positioned in the support flanges 286 a support bar 290.

On each end of the support bar 290 is a stud 292.

In the depending support flanges 286 is a passageway 294 for receiving the studs 292.

As is, readily, appreciated, the studs 292 can rotate in the passageways 294 and therefore the support bar 290 can also rotate.

On the upper surface of the support bar 50 and likewise on the supper surface of the support bar 58 are two spaced apart fluid actuated cylinders 296. The fluid actuated cylinders 296 connect with ram 298. The ram 298 projects through a passageway 300 in the support bars 50 and 58. The ram 298 connects with a block 302 having a stud 304 projecting out of one face. On each end of the support bar 290 or near each end of the support bar 290 is a tooth 306 having a diagonal face 308 and a point 310. On that face of the tooth 306 facing the stud 304 are two spaced apart rods 312 and 314 for receiving the studs 304.

It is to be realized that the tooth 306 is fixedly positioned on the support bar 290.

With the movement of the ram 298, the stud 304 slides between the rods 312 and 314 so as to rotate the tooth 306 and also to rotate the support bar 290.

Also, positioned on the upper surface of the support bars 50 and 58 are two spaced apart springs 318. The springs connect with rods 320.

The rod 320 connects with a block 322 having a passageway 324 for receiving a stud 326. The stud 326 is attached to the outer face, i.e., that face on the other side of where the rods 312 and 314 are positioned, and in a position to allow rotation of the tooth 306.

The stud 326 fits into the passageway 324 in the block 322.

When the fluid actuated cylinder 296 is actuated, the ram 298 moves downwardy or away from the support bars 50 or 58 so as to have the stud 304 move in between the rods 312 and 314 to rotate the tooth 306 downwardly. Also, the rod 320 moves downwardly as opposed to the force of the spring 318. When the fluid pressure is released from the fluid actuated cylinder 296, the spring 318 urges the rod 320 upwardly. The rod 320, upon moving upwardly, rotates the tooth 306 upwardly.

In addition to the teeth 306 with the rods 312 and 314 and the stud 326, there are a plurality of other teeth 330 having a diagonal surface 332 and a point 334.

The teeth 306 and 330 may be the same size and are fixedly positioned on the support bar 290.

In FIGS. 31–33 there is illustrated a number of positions of the teeth 270 and 272 and the teeth 306 and 330 with respect to the shake bolt 67.

In FIG. 31, it is seen that the shake bolt 67 has been positioned on the cradle 30.

The cylinder 278 has not been activated or is not under pressure so that the ram 276 is retracted. Therefore, the teeh 272 are retracted and are not bearing against the shake bolt 67.

Also, the fluid actuated cylinders 296 are not under pressure so that the rods 298 are not extended and the rotatable teeth 306 and 330 are not in contact with the shake bolt 67.

The cradle 30 is tilted in the direction of the teeth 270 so that the shake bolt 67 can bear against the teeth 270.

In FIG. 32, it is seen that the cylinder 278 is under pressure so that the rod 276 is extended and that the teeth 272 have been moved toward the shake bolt 67 and are forcing the shake bolt 67 against the teeth 270 and are also biting into the shake bolt 67. Also, the cylinders 296 are under pressure and the rods 298 have been moved downwardy so as to rotate the support bars 290 and the teeth 306 and 330 toward the shake bolt 67 with the teeth 306 and 330 biting into the shake bolt 67 and forcing the shake bolt downwardly. Also, in FIGS. 31 and 32 there is illustrated by means of phantom lines 340 the saw line for removing a shake 342 from the lower part of the shake bolt 67.

In FIGS. 31 and 32, it is seen that the shake bolt 67 is resting on the cradle 30. In this position, the shake bolt 67 can be moved away from the cradle 30 and toward the saw 220.

In FIG. 33, it is seen that the shake bolt 67 is not resting on the cradle 30 and is being supported by the teeth 270 and 272. Also, in FIG. 33, it is seen that the pressure has been released from the fluid actuated cylinders 296 and that the rods 298 have moved upwardly, due to the action of the spring 318 and the rod 320, so that the rotatable teeth 306 and 330 are not contact with the shake bolt 67.

In FIG. 34, it is seen that the cradle 30 is rotated in the other direction and that the teeth 270 and 272 and the rotatable teeth 306 and 330 are in contact with the shake bolt 67. Also, there is phantom line 344 showing the saw line for the shake bolt 67 for removing a shake 346.

In FIG. 35, there is illustrated how the rotatable teeth 306 and 330 bear against a thin shake bolt 67 or the tail end of a shake bolt 67. This makes it possible for the teeth 270 and 272 to bear against the sides of the thin shake bolt 67 and for the teeth 306 and 330 to force down on the shake bolt 67 so that when the shake bolt 67 passes by the saw 220 one or two more shakes can be sawed from the shake bolt. As a result, there is a greater utilization and more economic use of the shake bolt 67. The shake bolt 67 is more completely utilized by this operation.

In FIG. 36, there is schematically illustrated the fluid pressure system for activating the fluid actuated cylinders 296 and 278. There is a pump 350. A motor 352 or a prime mover 352 by means of a shaft or connecting link 354 connects with the pump 350. A fluid actuated line 356 connects with the pump 350. In the fluid actuated line 356 is a valve 358. A line 360 connects with the valve 358 and also with the fluid actuated cylinders 296.

The pump 360, by means of a line 362, connects with a two-way valve 364. The two-way valve 364 by means of a line 366 connects with the fluid actuated cylinder 278. Also, the valve 364 by means of a line 368 connects with the fluid actuated cylinder 278.

By means of the valve 364, it is possible to actuate the fluid actuated cylinder 278 so as to move the ram 276 inwardly and outwardly from the cylinder 278.

The valve 358 controls the flow of fluid to the fluid actuated cylinders 296.

A line 370 connects with the valve 358 and also with the fluid actuated cylinders 296. The line 370 may be a bleed off line for the cylinders 296.

In operation, the cylinders 296 can be activated by control of the valve 358 so that the rod 298 can force downwardly. Upon opening the valve 358 to bleed off the fluid from the cylinders 296, the spring 318 can force the rod 320 upwardly so as to force the rod 298 upwardly and into the cylinder 296.

In FIG. 36, there is illustrated a pneumatic system for controlling the operation of the cylinders 296 and 278. It is to be realized that in place of the fluid actuated cylinders 296, pneumatic cylinders 296, that there can be used hydraulic actuated cylinders. A slightly different system would be required using a reservoir and return lines for connection with reservoir and the reservoir, in turn, connecting with the pump. However, in FIG. 36, there is illustrated, schematically, a pneumatic system.

In the preceding FIGS. 23–36, and the written description of these figures, it is seen that I have provided a means for mechanically clamping and holding a shake bolt which has been positioned on a cradle. It is possible with its mechanical clamping of the shake bolt to move the shake bolt toward and away from the saw for sawing off a shake. The person operating this mechanical clamping means which uses fluid actuated cylinders and rams need not rotate the rod 112, see FIG. 7, so as to move the clamping teeth 60 toward and away from the shake bolt and the clamping teeth 52. In place of the clamping teeth 52 and 60, I have provided other types of clamping teeth and clamping means.

From the foregoing, it is seen that I have provided a means for sawing a shake from a shake bolt and which means is safe for an operator to use. With my invention there is less possibility of an operator physically harming himself by means of a band saw or a circular saw. With my invention, the operator is guarded so that his hands and arms are shielded from the saw. Further, I have illustrated two ways of clamping a shake bolt so that the shake bolt can be moved toward and away from the saw for sawing off the shakes.

What I claim is:

1. An apparatus for making a sawed shingle from a block of wood, said apparatus comprising:

a. a, substantially, horizontal saw for sawing said shingle from said block of wood;

b. a, substantially, horizontal cradle for receiving said block of wood and for positioning said block of wood at a slight angle to the horizontal saw and at a slight angle to the horizontal saw for the sawed shingle to have a thick end and a thin end;

c. a clamping means for clamping said block of wood while said block of wood is on said cradle;

d. a means for moving said clamping means toward said saw and away from said cradle; and e. said cradle being positioned near said saw and in an operative relationship to said saw.

2. An apparatus for making a sawed shingle from a block of wood, according to claim 1, and comprising:

a. a pivot means; and, b. said cradle being pivoted on said pivot means for rotational purposes for varying the position of the cradle and the block of wood with respect to said saw.

3. An apparatus for making a sawed shingle from a block of wood, according to claim 1, said apparatus comprising:

a. a block positioning means for positioning said block on said cradle; and, b. said block positioning means positioning said block of wood on said cradle to have said cradle and said block of wood canted with respect to said saw.

4. An apparatus for making a sawed shingle from a block of wood, according to claim 3, said apparatus comprising:

a. said block positioning means comprising a support for supporting said block of wood with respect to said cradle to position said cradle and said block of wood with respect to said saw.

5. An apparatus for making a sawed shingle from a block of wood, according to claim 1, said apparatus comprising:

a. said clamping means comprising teeth for bearing against said block of wood; and, b. a second means for moving said teeth to vary the position of the teeth with respect to the block of wood.

6. An apparatus for making a sawed shingle from a block of wood, according to claim 5, said apparatus comprising:

a. said clamping means comprising a lever means, operatively, connecting with said teeth.

7. An apparatus according to claim 1 and comprising:

a. said clamping means comprising clamping teeth; and, b. a means for moving said clamping teeth with respect to said block of wood.

8. An apparatus according to claim 1 and comprising:

a. said clamping means comprising a first set of clamping teeth and a second set of clamping teeth; and, b. a means for moving said sets of clamping teeth with respect to each other and with respect to said block of wood.

9. An apparatus according to claim 8 and comprising:

a. a first extensible ram for moving said sets of clamping teeth with respect to each other and with respect to said block of wood.

10. An apparatus according to claim 9 and comprising:

a. said clamping means comprising rotatable teeth; and, b. a means for rotating said rotatable teeth with respect to said block of wood.

11. An apparatus according to claim 10 and comprising:

a. said rotatable teeth comprising a first set of rotatable teeth and a second set of rotatable teeth; and, b. said rotatable teeth being capable of rotating to force said block of wood toward the plane of the saw.

12. An apparatus according to claim 11 and comprising:

a. a second extensible ram for rotating said rotatable teeth.

13. A combination of a block of wood and an apparatus for making a sawed shingle from said block of wood, said combination comprising:

a. a block of wood;

b. a, substantially, horizontal saw for sawing said shingle from said block of wood;

c. a, substantially, horizontal cradle for receiving said block of wood and for positioning said block of wood at a slight angle to the saw and at a slight angle to the horizontal saw for the sawed shingle to have a thick end and a thin end;

d. a clamping means for clamping said block of wood while said block of wood is in said cradle;

e. a means for moving said clamping means and said block of wood toward said saw and away from said cradle; and, f. said cradle being positioned near said saw and in an operative relationship to said saw.

14. A combination of a block of wood and an apparatus for making a sawed shingle from said block of wood according to claim 13, said embodiment comprising:

a. a pivot means; and, b. said cradle being pivoted on said pivot means for rotational purposes for varying the position of the cradle and the block of wood with respect to said saw.

15. A combination of a block of wood and an apparatus for making a sawed shingle from said block of wood according to claim 13, said combination comprising:

a. said clamping means comprising teeth for bearing against said block of wood; and, b. a second means for moving said teeth to vary the position of the teeth with respect to the block of wood.

16. A combination of a block of wood and an apparatus for making a sawed shingle from said block of wood according to claim 15, said combination comprising:

a. a pivot means; and, b. said cradle being pivoted on said pivot means for rotational purposes for varying the position of the cradle and the block of wood with respect to said saw.

17. A combination according to claim 13 and comprising:

a. said clamping means comprising clamping teeth; and, b. a means for moving said clamping teeth with respect to said block of wood.

18. A combination according to claim 13 and comprising:

a. said clamping means comprising a first set of clamping teeth and a second set of clamping teeth; and, b. a means for moving said sets of clamping teeth with respect to each other and with respect to said block of wood.

19. A combination according to claim 18 and comprising:

a. said clamping means comprising a first set of clamping teeth and a second set of clamping teeth; and b. a first extensible ram for moving said sets of clamping teeth with respect to each other and with respect to said block of wood.

20. A combination according to claim 17 and comprising:

a. said clamping means comprising rotatable teeth; and, b. a means for rotating said rotatable teeth with respect to said block of wood.

21. A combination according to claim 20 and comprising:

a. said rotatable teeth comprising a first set of rotatable teeth and a second set of rotatable teeth; and, b. said rotatable teeth being capable of rotating to force said block of wood toward the plane of the saw.

22. A combination according to claim 21 and comprising:

a. a second extensible ram for rotating said rotatable teeth.

23. An apparatus for making a sawed shingle from a block of wood, said apparatus comprising:

a. a, substantially, horizontal saw for sawing said shingle from said block of wood;

b. a cradle for positioning said block of wood with respect to said saw and for receiving said block of wood;
c. a clamping means for clamping said block of wood while said block of wood is on said cradle;
d. a first means for moving said clamping means toward said saw;
e. a block positioning means for positioning said block of wood on said cradle;
f. said block positioning means for positioning said block of wood on said cradle being capable of canting said cradle and said block of wood with respect to said saw;
g. said block positioning means comprising a support for supporting said block of wood with respect to said cradle to position said cradle and said block of wood with respect to said saw;
h. a rotatable shaft;
i. said support being positioned on said shaft;
j. said first means operatively connecting with said clamping means for moving said clamping means with respect to said saw;
k. said first means operatively connecting with said shaft; and,
l. said cradle being positioned near said saw and in operative relationship to said saw.

24. An apparatus for making a sawed shingle from a block of wood, according to claim 23, said apparatus comprising:

a. said first means comprising a cam on said shaft and a pawl;
b. said pawl, operatively, connecting with said clamping means and also, operatively, engaging said cam; and,
c. said pawl upon moving contacting said cam to rotate said shaft and to position said support with respect to said cradle.

25. An apparatus for making a sawed shingle from a block of wood, according to claim 24, said apparatus comprising:

a. said clamping means comprising teeth for bearing against said block of wood; and,
b. a second means for moving said teeth to vary the position of the teeth with respect to the block of wood.

26. An apparatus for making a sawed shingle from a block of wood, according to claim 25, said apparatus comprising:

a. said clamping means comprising a lever means, operatively, connecting with said teeth.

27. An apparatus for making a sawed shingle from a block of wood, according to claim 26, said apparatus comprising:

a. said first means comprising a first guard for protecting an operator of the apparatus; and,
b. said clamping means comprising a second guard for protecting an operator of the apparatus.

* * * * *